June 13, 1961     S. E. FISHER     2,988,045

ANIMAL TOY

Filed Dec. 28, 1959

INVENTOR

Stanton E. Fisher

United States Patent Office 2,988,045
Patented June 13, 1961

2,988,045
ANIMAL TOY
Stanton E. Fisher, 706 Lantern, St. Louis 24, Mo.
Filed Dec. 28, 1959, Ser. No. 862,334
2 Claims. (Cl. 119—29)

This invention relates to a simulated animal bone. More particularly, this invention relates to a simulated animal bone made of rawhide which is useful as a toy or pacifier for carnivorous animals such as dogs. Still more particularly, this invention relates to a simulated animal bone prepared from a rawhide sheet by rolling a sheet of wet rawhide into a cylindrical form, and while it is still wet placing at least one knot therein, for example, knotting at least one end thereof, but preferably both ends thereof, in order to simulate an animal joint, and then drying the product.

Animal toys for carnivorous animals such as dogs have become increasingly popular in recent years. In view of the fondness of dogs for bones, it is quite desirable to have a simulated animal bone useful as a dog toy or pacifier. However, in preparing such a product, it is highly desirable to prepare a product which will be appealing, long-lasting, and safe for dogs. In addition, the product should be non-staining so that furniture, floor covering, clothing, etc. are protected from damage.

I have now discovered a simulated animal bone made of rawhide, possessing these properties, which is useful as a toy for carnivorous animals such as dogs. Dogs are particularly fond of this product, since it looks like a bone. Being of animal origin, it has an animal odor which is appealing to dogs. Although it is hard, yet when chewed it has a certain amount of "give" without disintegrating within a short period of time and is thus a product which is long-lasting. If any piece of rawhide is swallowed by the dog, is can be digested by the animal, in the manner of meat. Furthermore, the dog owners will not object to this product since it is harmless to the dog and will not stain the household.

The following examples describe a non-limiting method of preparing the product of this invention:

Example 1

Figure 1:
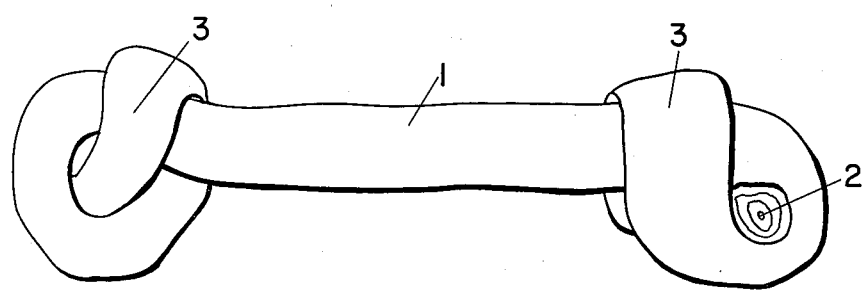

A wet rectangular piece of rawhide was rolled into a cylindrical form or roll 1, having as its ends 2, so that the length of the rectangle is the altitude of the resulting cylinder. It was then knotted by a simple overhand knot 3 on both ends to simulate a bone. The knotted product was then dried in a circulating warm air to yield the desired properties of hardness and uniformity of tightness. The drying process gives the knots the appearance of joints. The product thus formed was hard, yet had "give" and is particularly appealing to dogs. This product is shown in FIGURE 1.

Example 2

Figure 2:
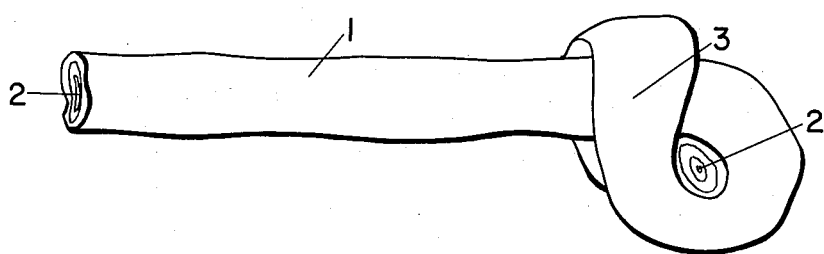

Another simulated bone of unsymmetrical proportion was made by repeating the above process and by tying only one overhand knot instead of two. This product is shown in FIGURE 2. It has the same reference numerals as FIGURE 1.

It is to be noted that the product in the above examples is of unitary construction having neither hardware such as staples therein, for the dog's safety, stitches nor other devices to be broken or dislodged.

The use of rawhide is critical to this invention. When denatured leather such as tanned leather is employed, the product is not as appealing to dogs since the appearance and appeal of natural, undenatured protein is lost. In addition, the use of rawhide imparts a remarkable simulation of a natural bone to the product. Furthermore, unlike tanned leather, the instant product is non-staining.

Rawhide leather is an animal skin or hide which has been de-haired and then dried. No tanning is involved in its manufacture. Suitable definitions of rawhide can be found in many texts on leather, for example, in the Hide, Leather and Shoe Encyclopedia.

It should be understood that many variations are possible within the scope and spirit of this invention. For example, the product may be made from rawhide in other than rectangular form such as a square sheet, a non-uniformly cut sheet, etc. In addition although the preference is for 1 or 2 knots therein, the product, if desired, could have more than two knots tied therein, i.e., three or more knots. The invention also includes rawhide knotted at a distance from the extremities, if desired. Variations in the method of preparation, etc. are possible, provided the rawhide product yields a hard, bone-like product of the type described.

For example, a simulated bone can be prepared, without rolling thin sheets of rawhide to achieve the bulk of the rolled cylindrical form, by employing a thick piece of rawhide of the desired length, width and thickness instead of the rolled cylinder shown in Examples 1 and 2. This thick piece of rawhide, as such, is then knotted while wet and dried in the manner of the rolled form.

Having thus described my invention, what I claim as new and desire to secure by Letters Patent is:

1. A simulated animal bone comprising a sheet of rawhide, the central portion of which is in the form of a roll and the end portions of which are in the form of knots.

2. A simulated animal bone comprising a sheet of rawhide in the form of a roll which contains at least one knot tied in said roll.

References Cited in the file of this patent
UNITED STATES PATENTS

| | | |
|---|---|---|
| 1,149,170 | Allis | Aug. 10, 1915 |
| 2,185,547 | Fowler | Jan. 2, 1940 |